United States Patent [19]
Jambor

[11] 3,763,733
[45] Oct. 9, 1973

[54] AUTOMATIC GRAVITY SAWING
[76] Inventor: Dorothy E. Jambor, 2157 Marne Ave., Milwaukee, Wis.
[22] Filed: Dec. 29, 1970
[21] Appl. No.: 68,862

[52] U.S. Cl. ........................ 83/766, 83/762, 83/756, 83/753, 144/134 R, 144/136 R
[51] Int. Cl. ........................ B27b 27/06, B27b 19/08
[58] Field of Search .............. 143/47 F, 47 R, 41 R, 143/6 G; 83/523, 582, 753, 756, 762, 766; 144/134, 136

[56] References Cited
UNITED STATES PATENTS

| | | | |
|---|---|---|---|
| 2,596,524 | 5/1952 | Bridwell | 143/6 G |
| 2,630,146 | 3/1953 | Van Tuyl | 143/47 F |
| 2,735,455 | 2/1956 | Forsberg | 143/6 G |
| 3,313,193 | 4/1967 | Orendi | 143/41 R |
| 3,450,001 | 6/1969 | Fortune | 143/6 G |
| 3,586,077 | 6/1971 | Pease | 143/6 G |

*Primary Examiner*—Donald R. Schran

[57] ABSTRACT

An angle, feed and speed, determining fixture for a portable power saber saw that firmly holds and guides the saw while performing its assigned cut—without the assistance or presence of an operator. The tool will automatically stop at the end of it's cut and the motor will also stop, with a limit switch conveniently located at the end of the cut. A motor speed control, located in the saber saw or on the fixture, maintains the proper speed for cutting different types of material while in operation. Once the material to be cut has been (set up) in this fixture, the only moving part is the complete power tool, created with the aid of gravity and friction plus the weight of the power tool as it slides down the guides of an inclined table. The angle of the table with the flanged guides, determines the "feed of the cut." The "speed" is controlled by either the speed control built into the power tool or one that is an integral part of the Automatic Gravity Sawing Fixture. The motivating power is gravitational feed. A single operator can therefore operate a multitude of Automatic Gravity Sawing Fixtures, depending on the compositional nature of the material being cut. A pine two-by-four can be cross cut sawed in about 45 seconds when the table angle is set at about 45° with the proper size blade installed in the saber saw. Naturally, angle iron or iron bar stock needs a slower feed and speed, so, the adjustment must be made accordingly. All correlationship between speed and feed is left to the discretion of the operator.

1 Claim, 4 Drawing Figures

AUTOMATIC GRAVITY SAWING

BACKGROUND OF THE INVENTION

This invention relates to the sawing or cutting of wood, plastic, or metallic material wherein the cutting element or member comprises a sabre saw, circle saw or any type of rotating or oscillating power tool traveling a fixed guide superimposed on the material being worked. This operation may be done manually or by its unique automatic gravity feed involvement in creating work the presence of an operator.

Guide means for guiding power driven tools is not, per se, new. However, the known prior art devices for guiding power driven tools are, for the most part, impractical and limited in application. Due to the absence of an operator during the cutting operation of the gravity sawing or cutting of the material, the guides must be constructed with the proper groove or the proper flange so that the fixture completely captivates the motorized power tool. The motorized power tool must never be in a position of working itself loose, even at its uppermost vertical working position.

The table tilting and protracting in the usage of power tools is not, per se, new. However, the unique design of using the combination of these principles plus the use of the laws of gravity, creates a new combination of effort to establish work without undue effort.

SUMMARY

This invention relates to an automatic gravity sawing or cutting fixture. More particularly, to an automatic gravity sawing or cutting fixture with its usage of a motorized power tool, will perform its work without the assistance of an operator. Upon the turning on of the electrical power leading to the fixture, the motorized power tool will, with only the aid of gravity, cut and then completely turn off the power upon completion of the cut. The protractor used on the table of the fixture is one of several types that may be constructed to aid in creating the angle or compound angle that may be required. The table tilting angle, which is also the major gravity performing angle, may be accomplished by a pivot as illustrated or the entire fixture can be mounted on a good ball and socket type of tripod. This type of placement for the fixture would eliminate many problems of storage, compound configurations of angles, etc. It makes a compact, yet a practical stand for the operation of the work to be done in a automatic gravity sawing or cutting fixture.

Since this invention is one of an automatic device using many commonly used mechanical devices in its composition and workability, the one claim of the unique gravitational feed accomplishment is the only claim to which this invention is being adhered to. This preferred embodiment is contained in the following description to aid in the making an Automatic Gravity Sawing Fixture. Although, the drawings adequately display one of the many designs to be used in the accomplishment, its construction and style are of many deviations. The model illustrated will cut with a motorized variable speed sabre saw, any angle or compound angle. It will at the completion of its cut, with the aid of an electrical limit switch, come to a complete stop. With the adjustment for gravitational feed, the sabre saw will gradually slide down and cut the material to be cut. The entire sawing operation plus the stopping of the power tool is achieved without the presence of an operator. The speed and feed of the power tool in an Automatic Gravity Saw and Cutting Fixture is left to the discretion of the operator since many factors must be considered: the best gravity angle, the best type of tool (teeth per inch plus grade of blade), the type of material to be cut, the weight of the power tool. Since weight and friction are two physical factors that control the action of gravitational effort, the operator must determine all the physical characteristics that concern the type cut and type of material to be worked on when the 'set-up' is made.

THE ILLUSTRATED CONSTRUCTION

This model is one of many styles of Automatic Gravity Saw or Cutting Fixtures that may be constructed. The construction of this model contains the inherent quality of the unique gravitational action that makes the automatic motion of the power machine tool possible. When constructed with care of fit of all parts, the finished machined piece will surpass most efforts made by a hand fed machined piece. This is due to the erratic nature of most machine operators. Undue hand feeding pressure, with a hand pressure feed, causes the machine to react accordingly, resulting in irregular and forced cuts.

The automatic gravity portion of cut is precise due to the inherent quality of automatic controlled gravity undisturbed by a human being. That is the reason for a reasonable 'toolsetting' of the operator at the start of the 'run.' From that point on, the operator has only to take out the finished material and clamp in the new piece to be cut. if similiar pieces are required. The only moving part of this fixture is the powered saw activated by its sawing action plus the laws of gravity.

DETAILED DESCRIPTION OF THE INVENTION

Figure 1:
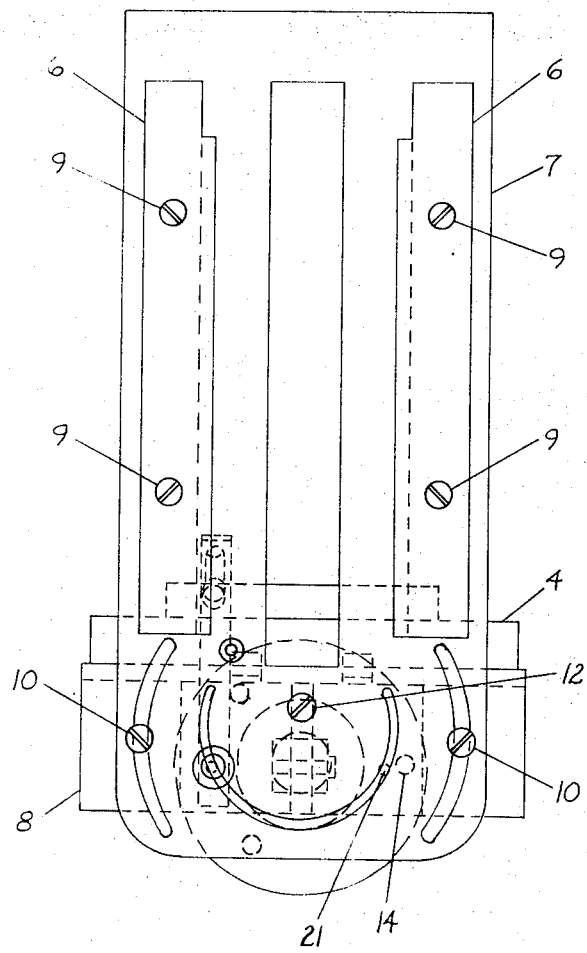
FIG. 1 is the top view of an orthographic projection of the entire gravity fixture constructed in accordance with the present invention. The saw table is shown in detail to illustrate its compositional nature.
Figure 2:
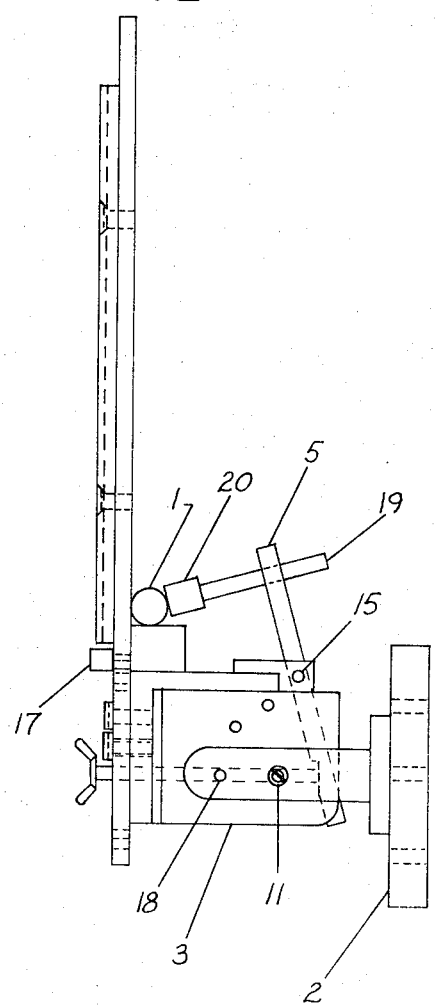
FIG. 2 is the side view of an orthographic projection of the entire gravity fixture. It illustrates a detailed view of the table in the horizontal position.
Figure 3:
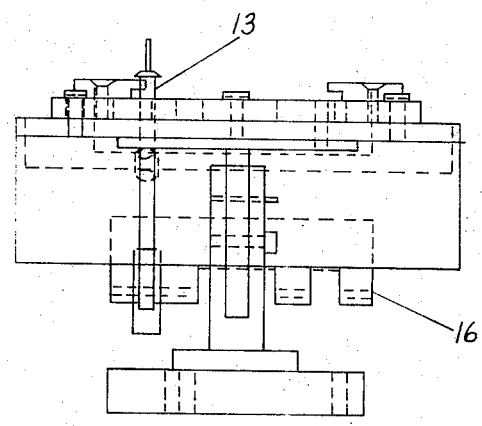
FIG. 3 is a detailed front view with the table in a horizontal position.
Figure 4:
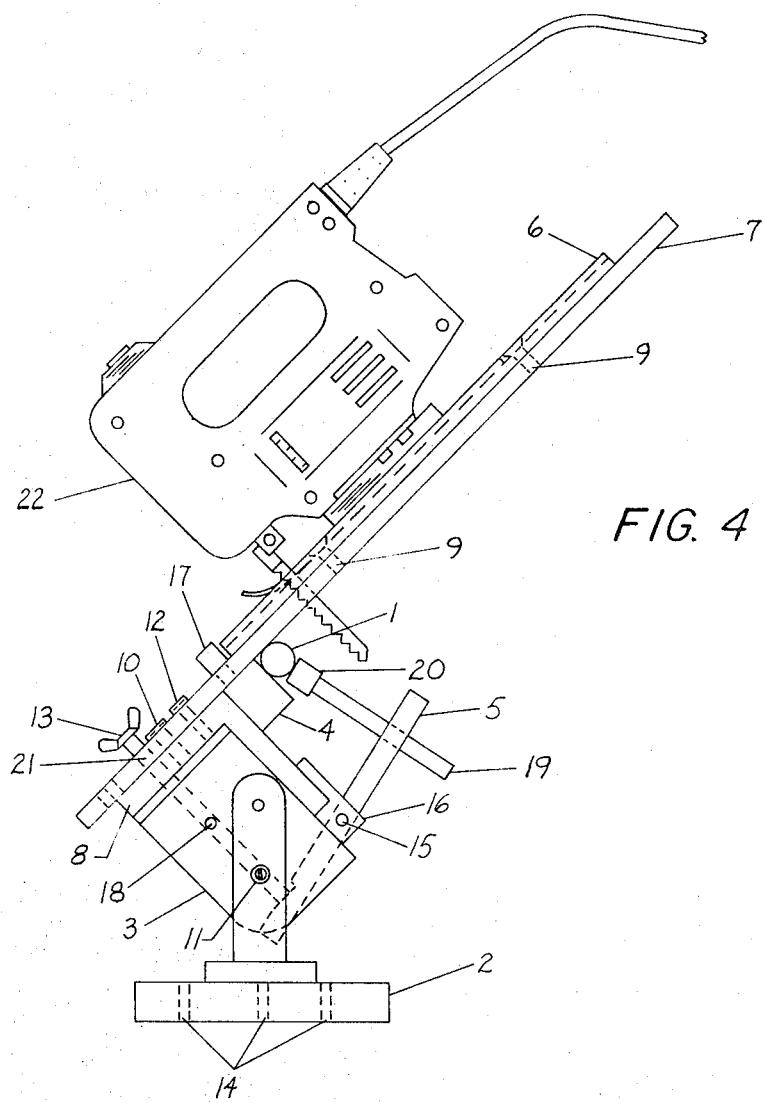
FIG 4 is another side view, FIG. 4 being the same side view as in FIG. 2, although, illustrating the saw action position with the saw mounted in the fixture at an arbitrarily selected position to make the desired gravity fed cut.

In the drawings on the first sheet the three views shown are in orthographic projection. The top view (FIG. 1) shows the protracting table (7). The table (7) used in this model was a sheet of metal containing a slot through which a saw blade could protrude to cut material. Two radial slots permit the two protracting table fastening screws (10) to loosen the table, then revolve it around shoulder bolt (12).. This allows the table to pivot into the desired protractor angle. Tightening fastening screws (10) secures the table (7). The inner radius slot of the table is a clearance slot for the rocker arm adjustment screw (13). This screw along with the entire stock clamp rocker arm (5) assembly are moved to the opposite hinge (16) position when the rocker arm (5) is endangered. The two power tool guide strips (6) are flanged to completely captivate the power tool. They are properly fused or fastened with screws (9) parallel with the center line of the table (7). An angle iron secondray base (8) is next fastened (10) (12) to the table (7). The secondary base (8) has three items attached to it. A wood block (4) is cemented to the secondary base (8). It serves to protect the blade or tool. On the same surface, a unique clamp rocker arm hinge (16) is mounted that contains two alternate positions to install clamp rocker arm (5) relative to the protracted position of table (7). This hinge (16) may also be fused or fastened with screws to the angle iron secondary base (8). The incline adjuster (3) of the type shown with a pivot screw (11) controlling the table angle incline or a ball and socket mounted upon a tripod could replace the entire base stand (2) (3) (11) (14) and (18). This solves the problem of fixture placement, storage and flexibility. The combinations of weight versus friction being the determing factor in the choice of tool and the choice of fixture angle in an automatic device using gravity as its motivational power allows for versatility in construction of an Automatic Gravity Sawing or Cutting Fixture. It can be Built with a sled consisting of a single sheet of plastic or metal material, square or rectangular and slightly larger than the base of the power tool or tools to be used. Fusion, welding, or other clamping methods may be used to fasten the power tool to the sled of the fixture. The fixture illustrated is ideal for anything small than a 2 inches × 4 inches stock of material (1) of unlimited length. It can be designated to suit the user. The rocker arm pivot pin (15) is held in with a set screw. The power tool stop may be a pin (17) or a limit switch. The rocker arm stud (19) and the rubber tip (20) holds the stock to be cut. The alternate hole (21) is used when cutting interference causes rocker arm (5) to move to its alternative position. The power tool (22) may be any power tool that saws, cuts, routs, grinds or performs any operation that is applicable to automatic gravity feed. Some models of power tools are too light in weight, but this weight problem may be rectified by a sled type of adaptable weight structure that allieviates this problem. The 'sled' used in the gravity adjustable table may be a single square, thin sheet of metal. Naturally it must closely fit the guides and be of sufficient weight to properly aid in gravity feed. The amount of adjustability of the gravity table is left to the descretion of the operator. The thickness of the 'sled' is also left to the discretion of the builder of the Automatic Gravity Sawing or Cutting Fixture. When the fixture is completely and conscientously constructed, it will saw or cut automatically without the presence or assistance of an operator. With the aid of an electrical limit switch, the power tool will come to a complete halt upon the completion of the cut.

I claim:

1. An Automatic Gravity Power Tool Fixture comprising:

a feed and speed determining angle table;

said angle table having flange guides along the length thereof to hold and guide a portable power tool along a cutting path;

a base stand having means extending upwardly therefrom;

a secondary base extending downwardly from the bottom of the said angle table;

means hinging the upward extending means to the secondary base for vertical swinging movement of said angle table;

angle locking means to hold the angle table in a selected vertical angle up to 90° maximum relative to the base stand;

clamping means on the said secondary base for holding cutting stock to the bottom of said angle table and against said secondary base in the path of guided tool;

said angle table being pivoted to said secondary base for adjusting the angle of the guide path relative to the clamped cutting stock;

and means to lock the angle table at a selected relative to said secondary base and the clamped stock.

* * * * *